(12) United States Patent
Roberts et al.

(10) Patent No.: US 11,283,886 B2
(45) Date of Patent: Mar. 22, 2022

(54) METHOD OF LOADING CLICKSTREAM DATA INTO A WEB ANALYTICS PLATFORM

(71) Applicant: SpyFu Properties, LLC, Scottsdale, AZ (US)

(72) Inventors: Michael Roberts, Scottsdale, AZ (US); Eugene Louis Young, Scottsdale, AZ (US); Ryan McLaughlin, Scottsdale, AZ (US); Tree Fine-Hardesty, Tucson, AZ (US); Kylan Kempster, Scottsdale, AZ (US)

(73) Assignee: Spy Fu, Inc., Scottsdale, AZ (US)

( * ) Notice: Subject to any disclaimer, the term of this patent is extended or adjusted under 35 U.S.C. 154(b) by 96 days.

(21) Appl. No.: 16/260,169

(22) Filed: Jan. 29, 2019

(65) Prior Publication Data

US 2019/0260841 A1    Aug. 22, 2019

Related U.S. Application Data

(60) Provisional application No. 62/632,929, filed on Feb. 20, 2018.

(51) Int. Cl.
*G06F 15/173* (2006.01)
*H04L 67/50* (2022.01)
(Continued)

(52) U.S. Cl.
CPC ............ *H04L 67/22* (2013.01); *G06F 16/955* (2019.01); *G06Q 30/0205* (2013.01)

(58) Field of Classification Search
CPC .................. H04L 67/22; G06F 16/955; G06F 30/0222; G06Q 30/0205
See application file for complete search history.

(56) References Cited

U.S. PATENT DOCUMENTS 8,775,941 B1    7/2014  Deshpande
8,930,818 B2    1/2015  Cordasco
(Continued)

FOREIGN PATENT DOCUMENTS

WO    2009064741 A1    5/2009

OTHER PUBLICATIONS

Hortonworks, Inc., How to Capitalize on Clickstream Data with Hadoop, Aug. 30, 2013, https://hortonworks.com/blog/how-to-capitalize-on-clickstream-data-with-hadoop/, Santa Clara, CA, US.

(Continued)

*Primary Examiner* — Ryan J Jakovac
(74) *Attorney, Agent, or Firm* — Lance C. Venable; Law Office of Lance C. Venable, PLLC

(57) ABSTRACT

The present invention relates generally to a novel and improved method of loading clickstream data into a web analytics platform, and, a commercial off the shelf (COTS) web analytics platform. The process of loading traffic into COTS Web Analytics platform from clickstream data relates to: (1) the process of discovering ecommerce sales by looking for specific tracking beacons in clickstream or resource stream and loading them into a COTS web analytics platform; (2) a process of discovering website "goals" by looking for clusters of tracking "beacon" activity in clickstream or resource stream data; and (3) a process of unlocking the search term that a website visitor typed into a search engine immediately prior to visiting that website when web analytics platforms can't see that data for many searches (99%+) having all of the features described above.

20 Claims, 4 Drawing Sheets

(51) Int. Cl.
*G06F 16/955* (2019.01)
*G06Q 30/02* (2012.01)

(56) References Cited

U.S. PATENT DOCUMENTS

| | | | |
|---|---|---|---|
| 9,501,781 | B2 | 11/2016 | Singh |
| 2002/0091736 | A1* | 7/2002 | Wall ..................... G06F 16/958 715/234 |
| 2008/0184129 | A1 | 7/2008 | Cancel |
| 2008/0189408 | A1 | 8/2008 | Cancel et al. |
| 2009/0248494 | A1* | 10/2009 | Hueter ............... G06Q 30/0204 705/7.29 |
| 2009/0307168 | A1* | 12/2009 | Bockius .............. G06F 16/9535 706/46 |
| 2011/0225287 | A1 | 9/2011 | Dalal |
| 2014/0379428 | A1 | 12/2014 | Phansalkar et al. |
| 2015/0161625 | A1 | 6/2015 | Heath et al. |
| 2017/0180496 | A1 | 6/2017 | Comstock |
| 2017/0244796 | A1 | 8/2017 | Liu et al. |

OTHER PUBLICATIONS

Hortonworks, Inc., Visualize Website Clickstream Data, Publication Date: Unknown, https://hortonworks.com/tutorial/visualize-website-clickstream-data/, Santa Clara, CA, US.
Clickstreamr, ClickStreamr: How it Works, Publication Date: Unknown, http://www.clickstreamr.com/how-it-works, Meath, Ireland.
Semrush, Benefit from you Competitors!, Publication Date: Unknown, https://www.semrush.com/features/, Trevose, PA, US.
Serpstat, Analyze All of Your Competitors Online, Publication Date: Unknown, https://serpstat.com/#index_competitors, Odessa, Ukraine.

* cited by examiner

METHOD OF LOADING CLICKSTREAM DATA INTO A WEB ANALYTICS PLATFORM

FIELD OF THE INVENTION

The present invention generally relates to the loading of clickstream data into a web analytics platform, and in particular, a commercial off the shelf (COTS) web analytics platform. Additionally, the process of loading traffic into a COTS Web Analytics platform from clickstream data relates to, and in this document discloses: (1) the process of discovering e-commerce sales by looking for specific tracking beacons in clickstream or resource stream and loading them into a COTS web analytics platform; (2) a process of discovering website "goals" by looking for clusters of tracking "beacon" activity in clickstream or resource stream data; and (3) a process of unlocking the search term that a website visitor typed into a search engine immediately prior to visiting that website when web analytics platforms can't see that data for many searches (99%+). Variations of the preferred embodiment are also provided.

BACKGROUND

Some examples of COTS web analytics platforms are Google Analytics, Adobe Analytics, MixPanel, KissMetrics, Clicky, Segment, Woopra, and Matomo, etc. These platforms are all built primarily for recording and analyzing the behavior of visitors to websites. They have many common features like being able to see how many visitors browsed in a certain time, the number of page views, the bounce rate, the time a visitor spent on a page, etc. Typically, one can also see from where users originated such as a paid search, organic search, referring website, email, direct, etc. These platforms also allow one to drill in much deeper than these top-level metrics and examine metrics for individual pages, groups of pages, segments of users, etc. Another commonality is the ability to examine conversion metrics, like the percentage of visitors who completed a goal or made a purchase.

Another common characteristic of COTS web analytics platforms is how data gets into them. Typically, website owners create an account with the web analytics platform and install some software (often in the form of a JavaScript snippet) onto their websites. If the website owners remove the software and delete the account, the analytics would no longer exist. COTS web analytics platforms are fundamentally designed to receive data directly from the website itself.

There are certain things that are not considered COTS web analytics platforms. Several vendors have built custom websites to display web analytics based on clickstream data. The terms vendor, tool, product, and custom website are used interchangeably in this disclosure. Those vendors include, for example, Alexa.com, Compete.com, and SimilarWeb.com. These products display information and metrics that are similar to a COTS web analytics platform. Superficially, the top-level "summary" page for a website might look very similar to the top-level "summary" page for the same website of a COTS web analytics platform. But, they are different in important ways:
  a. First, the way these tools get their data doesn't require the website owner to do anything. They don't need to install any software on their website. The website owner doesn't need to create an account on a vendor's website such as SimilarWeb.com for SimilarWeb to have analytics for their website. These tools are not fundamentally designed to receive data directly from the website itself. The tools run first and foremost off clickstream data.
  b. Second, they lack the depth of a COTS web analytics platform. These tools were not designed to compete with COTS web analytics platforms. They were designed to enable a user to see the high-level web analytics of any website. A user could enter competitors' domains and see how much traffic they receive and from where it came. But, functionally, a user cannot obtain much additional information. There are several functions that these tools do not provide that COTS web analytics platforms can. For example, a user also can't create custom user segments, and can't see conversion or page-level metrics.

Several software products exist that could be called COTS Analytics Platforms but are not COTS "web" analytics platforms. Just because website traffic or log data can be loaded into software and run queries and show visualizations doesn't make it a web analytics platform.

For example, tools such as Tableau, Looker, Domo, and Google Data Studio are not COTS web analytics platforms. These tools enable one to create custom visualizations of various types of data. A dashboard can be made that connects several different sources including web analytics platforms. So, one can create reports and dashboards in these applications that look extremely similar to reports one may see in a web analytics platform. But, these tools' primary purpose is not Web Analytics, and they don't need to be implemented by installing code onto a website to start working. These tools are usually called Business Intelligence Software or Data Visualization Software.

Clickstream Data

Clickstream data is understood and defined in the prior art. Clickstream data for a single user, simply stated, is the user's web browser history. When one combines several browser histories, those histories can be used to determine how many times a certain website is visited. If a person had all the browser histories for all the users in the world, that person would have a complete picture of all web traffic for all websites. No clickstream data set has all the users in the world; they're all based on some sample called a panel. A panelist may have installed a browser extension or toolbar, desktop software or mobile software, or used a VPN or proxy provider, or a certain Internet Service Provider (ISP). No matter the method, the software collects the web browser (and potentially other network traffic) activity and sends it to a central location for storage.

Technically, clickstream data is often more than what can be seen if one examined a web browser history. A browser history would show the web pages visited either by typing them into the browser directly or clicking on a link. Clickstream data often contains much more than just those top-level requests. Every time a web page is loaded, the browser uses resource calls to load dozens or hundreds of additional resources such as images, JavaScript, CSS, etc. Some of those resource calls are tracking "beacons" telling web analytics platforms and Web Advertising Platforms about page loads, on-page events like button clicks, goal tracking, and other information like e-commerce sales. These resource calls are defined as Resource Stream.

As is detailed below, the present invention makes significant use of both the clickstream and the Resource Stream data.

Web Advertising Platforms

"Web Advertising Platforms" is not a technical industry term; it is used to cover a broad range of ad technology including Demand Side Platform (DSP), Supply Side Platform (SSP), Data Management Platform (DMP). In large ad ecosystems like Google and Facebook, there are several ways to buy and target ads, and the interactivity between the various subsystems is complex. The Google Ad Platform includes ad buying via Adwords and DoubleClick and publishing via AdSense and DoubleClick for Publishers. But, one can also use Google Analytics to build "audiences" of visitors to advertise to. One can also use those same Google Analytics audiences to generate "similar to" audiences. Facebook's and Adobe's platforms have similar interactions.

BRIEF DESCRIPTION OF THE DRAWINGS

A more complete understanding of the present invention may be derived by referring to the detailed description and claims when considered in connection with the following illustrative figures, like reference numbers refer to similar elements and steps throughout the figures.

FIGS. 1(a-c) illustrate the Process of Loading ClickStream Data into a Standard COTS web analytics platform utilizing a flowchart.

DESCRIPTION OF PREFERRED EMBODIMENT

The following are descriptions of a preferred embodiment and variations of the preferred embodiment of the invention.

In the following description, and for the purposes of explanation, numerous specific details are provided to understand the various aspects of the invention thoroughly. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1A:
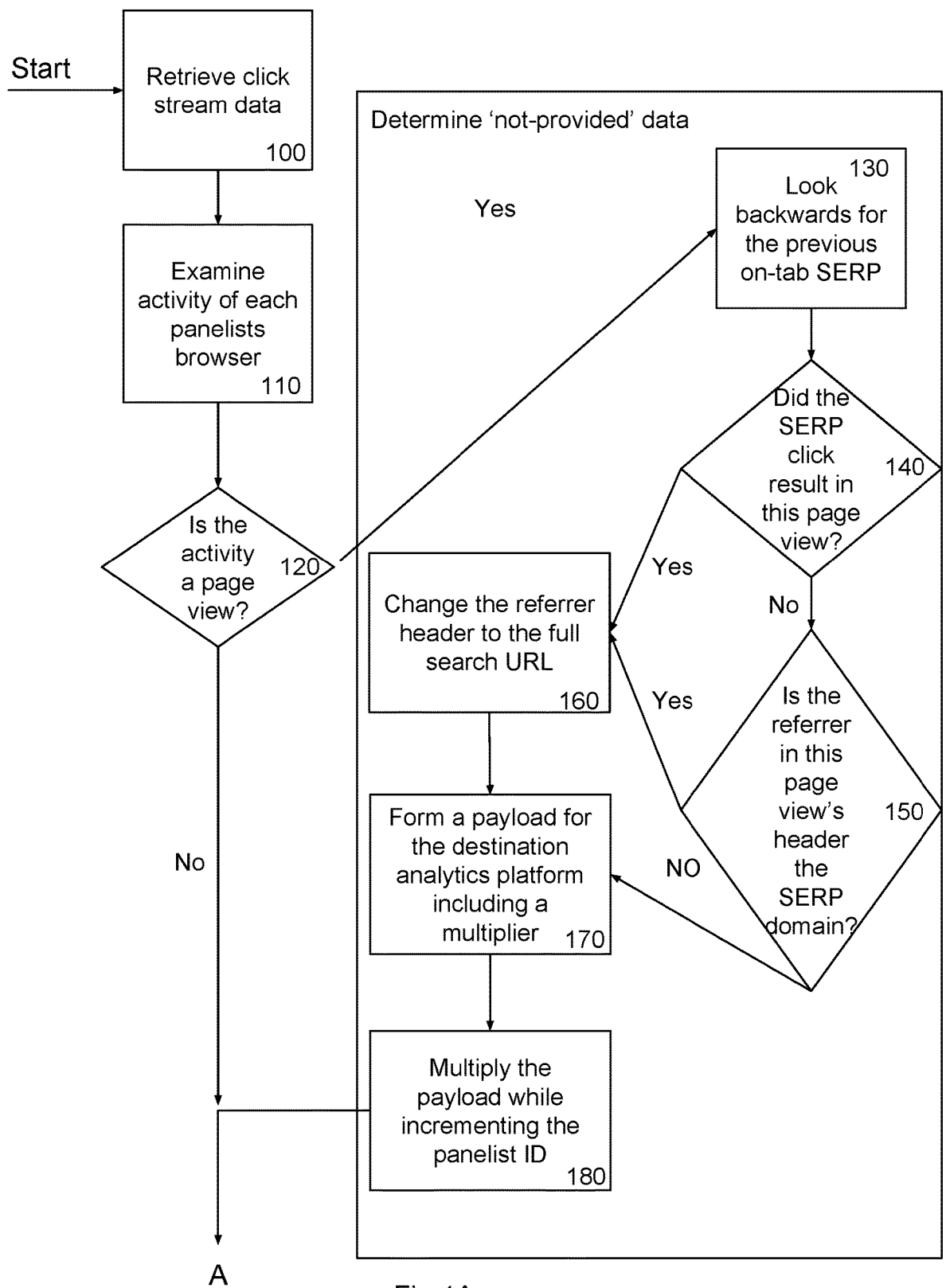
FIG. 1a illustrates the first third of a flow diagram showing the major steps of the method of the invention.
Figure 1B:
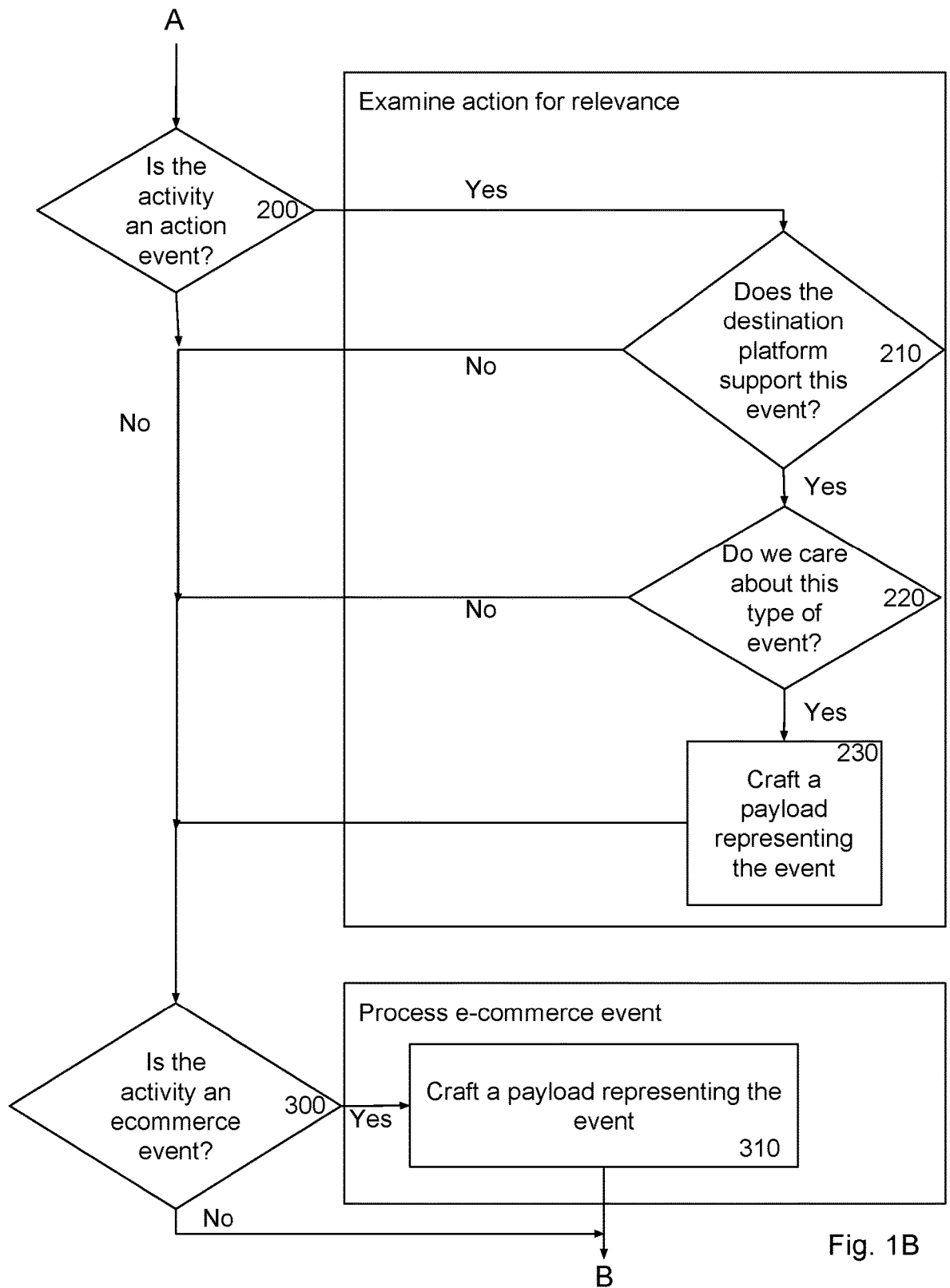
FIG. 1b illustrates the second third of a flow diagram showing the major steps of the method of the invention.
Figure 1C:
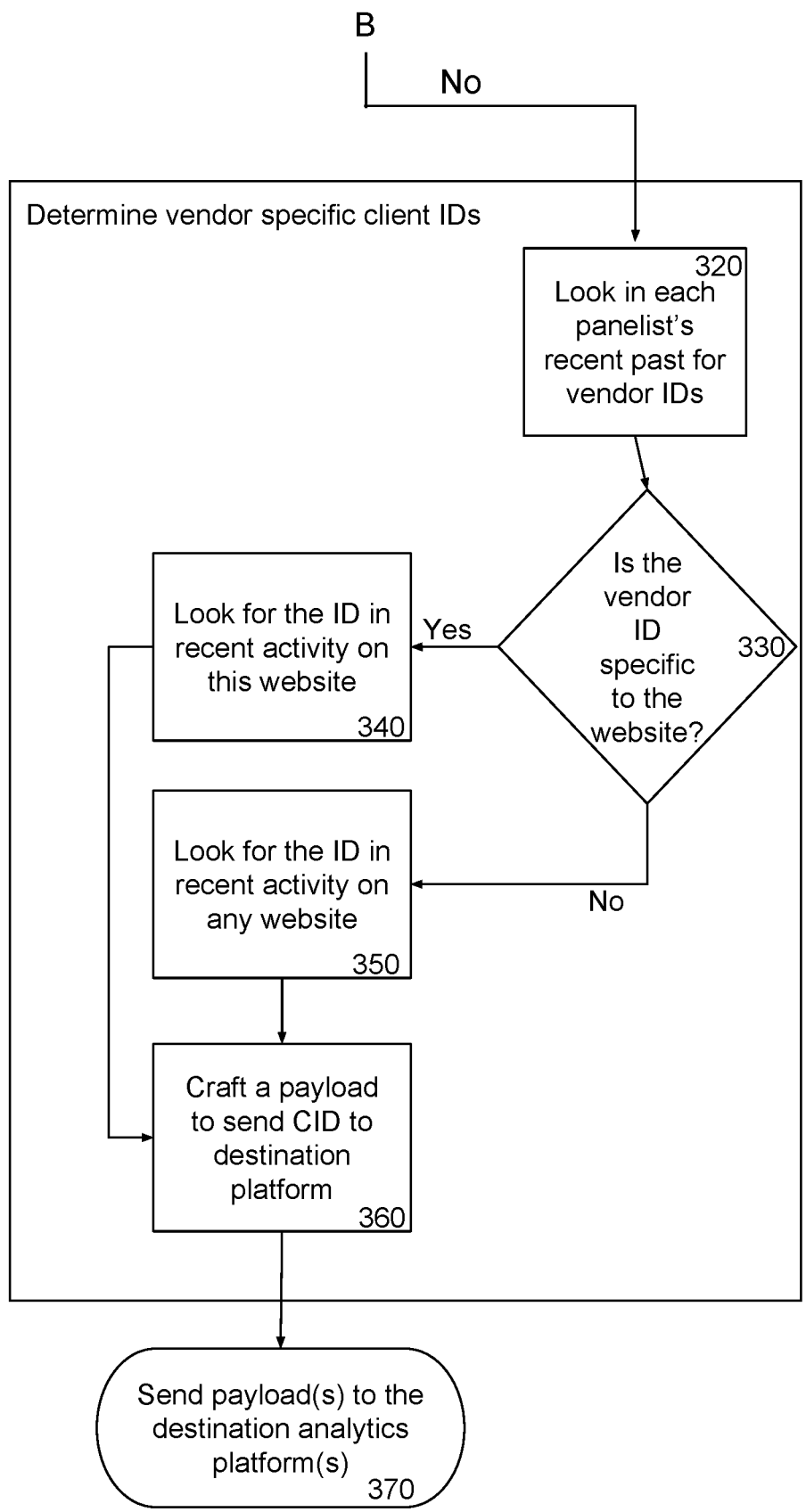
FIG. 1c illustrates the final third of a flow diagram showing the major steps of the method of the invention.

FIGS. 1(a-c) illustrate the Process of Loading ClickStream Data into a Standard COTS web analytics platform utilizing a flowchart. Each step in FIGS. 1(a-c) is described below.

The process begins with step 100 by retrieving clickstream data from a panelist's web browser. On a periodic basis, a user accomplishes this step, and all the subsequent steps, by using a host computer that is connected to the internet and capable of accessing data from third-party computers. In step 100, host computer retrieves a quantity of clickstream data from a given source such as a log file that is produced by the source and may be kept in a location such as a remote storage computer or cloud storage location. Regarding the log file, every time a user navigates a web browser to a website certain navigational meta data is sent to an application programming interface or API. This API aggregates all the data into clickstream log files, which are then written to the central location. Other sources of the clickstream data, such as an internet service provider log files, virus scan software, and mobile apps can be used as well as could be appreciated by one of ordinary skill in the art. The host computer accesses a sufficient amount of clickstream data that is necessary from the log file at the central location and returns it to the host computer.

The next step 110 is to examine the log file for the activity of each panelist's web browser and determine the type of activity and the website and precise URL to which it is attributed.

There are typically two types of activities that are examined. The first step 120 is whether the current activity represents a page view. In other words, determine whether the user visited and viewed a specific page on the website. The log file typically includes specific indicators that can confirm a page view.

If a page view did occur, then by using the query resultset, determine 'not-provided' (organic search) data by checking each stream's previous activity.

Often important data is hidden from analytics tools due to what's often referred to (in the search marketing industry) as "not provided." The term "not provided" comes from Google Analytics and means all traffic that came from organic search results (like Google.com or Bing.com), but where the search keyword can't be determined. The data that gets lost is the exact URL that the user visited before visiting the website being tracked. For example, in a Google search, one might see that the user came from Google.com, but it can't be determined what their search was that led to the visit to the website. The present invention overcomes this limitation by examining the user's history and determining which searches got them to the website. The current invention is not only trying to unlock that data, but also any other source where the full referring URL can't be seen.

The next step 130 is to look backward in the user's clickstream for the previous search engine result or ("SERP") such as an on-tab search engine result. This is done by determining whether the previous search resulted in the current page view. The determination is made by examining two conditions: (1) step 140, which was the search engine result page (SERP) clicked, resulting in navigation to the current page? If so, an attribute is provided. If not clicked, then proceed to step 150, and determine if the click was not captured, the referrer in the page view's header is the SERP domain such as google.com, or some other search engine URL such as google.co.uk, bing.com, google.ca, or baidu.com. This will also provide an attribute. If either of these two conditions is met, then proceed to the next step.

In step 160, once the determination is made, the way to make "not provided" organic keyword data is to change the referrer header from the root domain URL such as (https://www.google.com/) to the full search URL to a form like: (https://www.google.com/search?q=keyword). Doing so, allows the Web Analytics Platform to "see" the organic search keyword that would have been labeled "not provided." A payload, or data structure, is then formed in containing formatted text in step 170. Once created, the payload is then forwarded to the destination analytics platform. The payload will include any data that is sufficient to provide the destination analytics platform with the ability to analyze information on the page views further. The payload page view data, for example, may include the page URL, the referrer URL, a user ID, a time stamp of when the page view occurred, and the user's IP address that the user viewed the page in. This data is then analyzed to determine a proper multiplier, which is typically based on the geographic origin of the user. Then, as shown in step 180, the data structure is replicated based on the multiplier to ensure that the page view data in the payload most closely estimates the actual traffic of the website. If no page view occurred in step 120, then the next step as shown in step 200 is for the host computer to determine whether the activity was an action event. A typical action event by users occurs when, in the context of viewing a webpage, play a video, click a button, or click on a form.

These events could be captured explicitly by an existing web analytics platform. Google Analytics (GA), KissMetrics, MixPanel and Segment as examples, all allow for explicit logging of these kinds of events. In that case, one would look for those calls to happen. In the case of a video playing, this could simply be observed by looking for a specific type of URL request to a streaming service like YouTube or Wistia. Events could also be observed by recording document object model (DOM) interaction. For example, the process could look at the page and see that it has a button labeled with the text "tutorials" and see a click event happened on the DOM element with that label and infer an event—"tutorials clicked."

If it was determined in step 200 that the activity was an action event, then the next step is to determine in step 210 whether the destination analytics platform supports the event. In other words, can the analytics platform do something with the event information like recognizing that a video was playing on the webpage? If the analytics platform cannot support the event, then the host computer moves on to step 300. If the analytics platform does support the event, then the next step is step 220, which is to determine whether the event is something that the user considers to be important enough to create a payload that represents the event. An important event would be, for example, a predetermined or customizable and configurable list like user settings that are stored in a central location. If the event is not considered important, then the host computer moves on to step 300. If the event is considered important, then the next step is step 230. Step 230 is the creation of a custom payload as in the steps 170 and 180 and move to step 300.

Step 300 is the step of determining whether the activity was an e-commerce event that happened in the context of a user viewing a page. E-commerce events are a subset of non-page-view events that may deserve special attention. E-commerce events are determined by analyzing the URL for specific text that indicates the event was a sale or other similar event that occurred like a product purchase through a website like Amazon. Some web analytics platforms (like GA) have a special API call to report an e-commerce sale. The call reports the total dollar (or other currency) amount of the sale, product identifier(s), product name(s), amounts for each product, tax, shipping, an order ID, customer ID, etc. When those events are sent, capturing them is very valuable for a variety of reasons. One reason is that sales (and the revenue that comes from them) are a much more useful metric for measuring the performance of everything on a website. Determining whether a page is effective at converting visitors into buyers is usually more actionable than whether a page is effective at attracting and engaging visitors.

Sometimes, there is no direct web analytics call reporting an e-commerce sale. But, there are a variety of other vendor's "beacons" that report a sale. Ad platforms like Facebook and DoubleClick use conversion tracking code placed on a website's receipt/"thank you" page to make a call telling those platforms that a sale happened. The call, which is often just an HTTP Get of a tiny 1×1 image called a tracking pixel, often contains the amount of the sale, order id, etc. Affiliate marketing platforms like Commission Junction and Shareasale track conversions from the "receipt" page in a similar way as ad platforms. If the event was not an e-commerce event, then the next step is step 320. If the event was an e-commerce event, then the next step is step 310, which is to process the event by crafting a payload for delivery to the analytics platform as described in steps 170 and 180 above. After crafting the payload and delivering it, the next step is step 320.

The next group of steps involves determining any vendor specific client ID's (Vendor IDs)—for instance if a user visited a company like Target's website. The first step (step 320) involves determining specific client identifiers for each panelist. Typically, web analytics platforms like Google Analytics and ad serving platforms like DoubleClick and Facebook have global client IDs that are sometimes stored in a cookie that are used to track users across websites and, indeed, all over the internet. They also use "join IDs" that tie a website-specific client ID to these global client IDs. There are a variety of reasons to capture these vendor-specific client identifiers. These may include: (1) web analytics platforms can use them to show demographic and psychographic audience statistics and insights; (2) ad platforms use them to target users via demographic and psychographic segments; (3) web analytics platforms can work with ad platforms to target ads to users that have certain web analytics characteristics. For example, an ad platform can use a web analytics platform to target users who have visited a specific page on a website and show them ads all over the Internet. This type of relationship exists between Google Analytics and the Google Ads platform, for example.

As part of step 320, the recent past of panelists should also be examined to discover the IDs. If they can be found on the current site, that's ideal, but depending on the vendor, may not be necessary. In step 330, for each vendor, it is determined whether the vendor ID is specific to the website by examining global client ID's that are sometimes stored in cookies. If yes, then proceed to step 340, which is to look for the vendor ID in the panelist's recent activity on the vendor's website like target.com or amazon.com and then proceed to step 360, which is to craft a payload to send the client ID to the destination platform like Google Analytics. If no, then proceed to step 350 and look for the ID in the panelist's recent activity on any website that the user visited and see if the client ID is located there. After step 350 is complete, then the next step is step 360, which is to craft a payload to send the client ID to the destination platform like GA. Then, as shown in step 370, the payload is sent to the destination analytics platform for further processing. After sending the payload, then the process starts over again by returning to step 100.

The payloads that are crafted for being sent to a specific analytics platform uses that analytics platform's schema, which typically comprises the following information: (a) page view (the user visited this page); (b) vendor-specific (this website-specific user who is also this vendor-specific user visited this page/site); non-page-view events (clicked a button, filled out a form, etc.); and (c) when activity is determined to be an e-commerce event, craft a new payload that represents the event. Each payload that is sent is delivered to the destination analytics platform multiple times based on the domain's multiplier value while incrementing the panelist ID for the multiplied message. Also, if no client ID is found after steps 100-360, then step 370 may include sending a payload showing no client ID. It is also optional that a payload is sent at all. This is up to the user. After the payloads are sent to the analytics platform, the process starts again at step 100.

Figure 2:
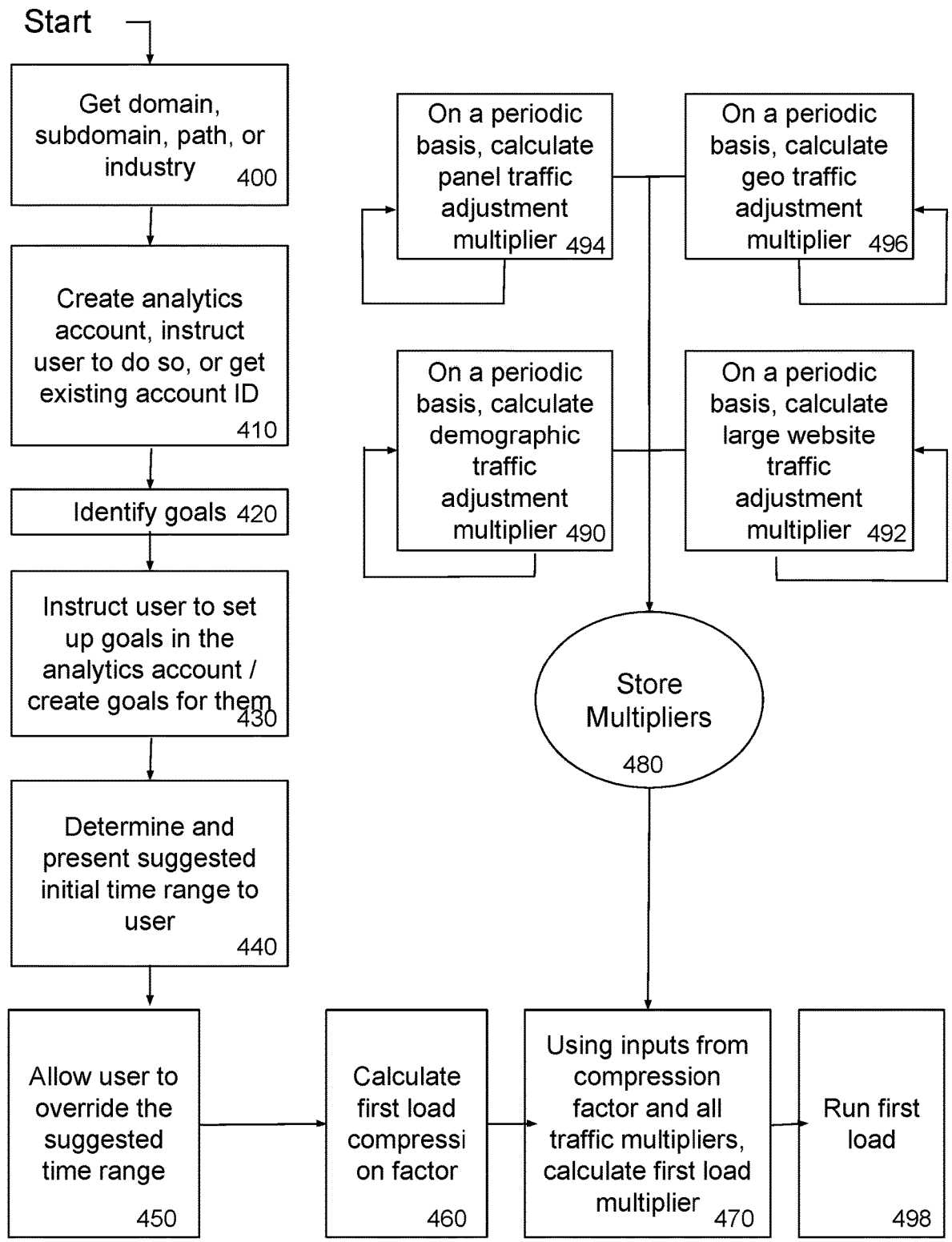
FIG. 2 illustrates the Business Process for Account Setup and First Run utilizing a flowchart.

FIG. 2 illustrates the Business Process for Account Setup and First Run. These steps are typically completed before steps 100-370. Each step in FIG. 2 is described below.

Step 400 is obtaining or choosing the website to track. The software asks the user which website it would like to see the web analytics for. If it wants to see the web analytics for example for cnn.com, "cnn.com" would be entered. Another variation is that the user only wants to see a subdomain. So, the "website" that it wants to see could be "blog.cnn.com." Another variation is that the user only wants to see a subdirectory or "path" of a website. For example "reddit-.com/r/bigseo." Moreover, yet another variation is that the user wants to see several websites, perhaps an entire micro-industry all rolled in together in one analytics account. For example: "homedepot.com," "lowes.com," "acehardware-.com."

Step 410 involves obtaining a (new) Analytics account from the user. In this step, the user is prompted to create a new web analytics account. In Google Analytics this is called a property. Creating a property involves setting the website name, the root URL, a time zone, and industry category. The important output is a property ID or account ID. This ID is what is used to send data in. In Google Analytics this ID looks like UA-XXXXXX, where the X's are numbers. Note that, while Google Analytics is referenced as an example, every web analytics platform works similarly, and no matter what is needed an ID or possibly a combination of ID's—for example, the process may need an account_id *and* a property_id in some cases.

In practice, the process may not need the user to do anything but give the software access to their account. For Google Analytics, this could be via OAuth or account permissions, for example. Once access is granted, the process does all the property creation, etc. Another way to do this would be to create accounts from scratch for a user. Permission would not be needed to an account that was created by the user. The software would then set everything up, and then grant permission to the user for the account that was just created. Another way that the process could do this is to create a property for the user in another account, and then grant the user access. In Google Analytics, the process could give account, property, or view-level access to any Google account such as Gmail. The process can also give the user read, edit, and user management privileges accordingly. A variant on this would be to create a property for many websites in advance and then just grant access to users as necessary. This would allow the process to deliver historical data on the first run.

Steps 420 and 430 are to identify goals and then instruct the user to set up the goals in an analytics account or have the account set up/create goals for the user respectively. Web analytics platforms have things referred to as "goals." Goals are basically things you want visitors to your website to do. Examples are: "complete a purchase," "sign up for a newsletter," "complete a form," "sign up for a trial," "watch a video," etc. When a goal is completed, it is referred to as a conversion. The process generally configures and records goals for users because conversion metrics are very useful—often more useful than audience and traffic metrics.

Some web analytics platforms explicitly declare goals in API calls that get called from the website. In that case, the process doesn't need the user to do anything at sign up. Some web analytics platforms (particularly Google Analytics) do not necessarily declare goals explicitly in API calls; they declare them in the analytics platform itself. Often, that means creating a "rule" or "mapping" in the analytics software that says: "If the user visited this page (example: "/receipt.html") then log that as a goal completion." In Step 430, for those analytics platforms, the process should generally help the user set up those goals (or that the process sets them up for them automatically). Some web analytics platforms use a combination of both. Google Analytics as an example—has analytics goals that are defined in the platform itself, and then ecommerce events that are explicitly called in code. In any case, where all the goals are not explicitly defined in code, the process ideally should try to infer what the goals might be. Because without goals, it is possible to lose all the conversion metrics that are automatically calculated by the web analytics platform.

Step 440 involves figuring out a suggested time range. For any given website, the process may not have access to all the visitor traffic. The clickstream data that the process has represents a sample of visitor traffic—perhaps 0.5-2% of all the website's traffic. For relatively large websites, that might mean hundreds or thousands of raw visitors per day. But, whereas there are tens of thousands of websites that have that level of traffic, there are tens of millions of websites that don't.

In many cases, there is not enough data available to meet the minimum amount web analytics platforms may need to be useful. Obviously, if the clickstream data has zero visitors for a website on the day the user signs up, the web analytics account would be empty. That could create a bad user experience. And showing just one visitor is a lot better, but still not as desirable.

By default, it may be desirable to want to show some minimum number of visitors, particularly when the user signs up. It might be determined that the target amount is 100 visitors, or 1,000 page views, or 400 users. There are a variety of metrics and values that might be used. Given the target amount of traffic, the process might want to load in historical data at first run. Depending on the web analytics platform, the process may need to load in the historical data as though it happened recently. For example, if it is a target is to load at least 100 visitors, and it is determined that for the requested website, there are about 1,000 visitors per month, it may be better to choose to load ten days of historical data on the first load. If the requested website only has 100 visitors per month, it may be desirable to choose to load an entire month. In other circumstances, it may be desirable to choose to load several months or a year. In other circumstances, it may be desirable to load several hours or a day of historical traffic.

Additionally, it may be desirable to choose to load the historical data evenly or unevenly throughout the course of a day, week, or even month. The reason to load it in that way is so that a user could visualize day-of-week or hour-of-day trends accurately. For example, does the website get most of its traffic during business working hours? Given these considerations, a desired output is a recommended (or default) amount of historical data, and a recommended load timeline.

Step 450 allows the user to override the suggested time range if that is desirable. It may or may not be desirable to offer users the ability to override the process' recommendation. But, if this was the case, it's possible to allow them to set their own historical amount and load timeline. For usability, it may be desired also to choose to simplify this. For example, it may be desired just to let users choose the number of weeks' worth of historical data load, and automatically load it over the course of a week, being sure to weight the days and hours appropriately.

Step 460 involves calculating a panel-to-full-traffic adjustment multiplier also known as a load compression factor. For any given website, the process may not have access to all visitor traffic. The clickstream data represents a sample of visitor traffic—perhaps 0.5-2% of all the website's traffic. For web analytics platforms to accurately calculate "roll up" metrics like "total # of visitors," "total # pageviews," etc., it may be necessary to simulate a multiple of visitors for every "panel visitor" that has been acquired. For example, if the clickstream sample has 100 users for a website on a given day, it may be desirable to load each user 100 times to simulate a traffic load of 10,000 visitors/day.

Example—Problem 1

The clickstream panel is constantly growing (or shrinking), and users are coming and going. So, size (and bias) changes day to day, month to month. The solution is to use a default multiplier. A default multiplier compares the traffic volume (visitors, pageviews, etc.) from the panel to the traffic volume of a site or group of sites for which full traffic was obtained. For example, Wikipedia might disclose their actual web traffic as 1 billion page views for a given week—the panel may have 100 million page views for the same week. From that number, it might be concluded that there is a need to multiply the traffic by 10×. There is almost certainly a benefit from taking many such data points (from more than just one website or group of websites) into account to arrive at the default traffic multiplier. A weighted average where data sources are weighted by their transparency, sample size, and trustworthiness is one such approach. Note that some of the sources don't need to be first party traffic metrics (from Wikipedia themselves); it is possible to use third-party estimates (somebody else's estimate of Wikipedia's traffic). A complicating issue using this default multiplier is that the process can't just calculate a multiplier once and conclude. The process may likely need to calculate a multiplier regularly: hourly, daily, weekly, or monthly. Generally, calculating a multiplier weekly may make the most sense.

Example—Problem 2

The clickstream panel has geographical biases. Using a highly US-centric approach to simplifying this problem: assume that 40% of the panel is US-based and 60% is Non-US-based. Now assume that real Internet traffic is 20% US and 80% non-US. In this case, it would be over-sampling US traffic and under sampling non-US traffic. So, it may have to be corrected for that. The solution is to use default geographic multipliers. By using the same basic technique used to calculate the default multiplier, it is possible to compare the known source's traffic percent to the panel's. By combining the various traffic estimates segmented by geography, it is possible to calculate estimates of any geographical bias and create geo-specific multipliers. So, it may be desirable to determine that it is needed to multiply the US-based panelist traffic by 50× and the Spain-based panelist traffic by 200×. By using this technique, it is possible to calculate a default multiplier for every sub-continent, country, state/region, metro area, etc.

Example—Problem 3

The clickstream panel may have demographic biases. Similar to the geographic bias, it may be oversampling gender or age or any other demographic. The solution is to use default demographic multipliers. By using a similar technique to the geographic default multipliers, it is possible to correct for the demographic biases by quantifying the bias by comparing to known sources and deriving a multiplier for each demographic type. For example, if the sources show that Internet traffic is 50% male, but there is 40% male in our panel, it may be possible to multiply the male panelists by 1.25. It is also possible to combine geographic and demographic multipliers. Building on the previous examples, it is possible to multiply the geographic multiplier by the gender multiplier to get a default geo-demographic multiplier. For example: Spanish-Male multiplier=200×1.25=250×. Alternatively, provided enough data, those combinatorial multipliers could be calculated just like a normal geographic multiplier.

For large enough sites, it is also possible to calculate website-specific multipliers. In some cases, it may be possible to get (likely) third-party estimates of geographic or demographic traffic percentages. In those cases, where the site-specific estimates are determined to be better than the default multipliers, it may be possible to use a similar technique to calculate the multiplier for that website.

Step 470 involves calculating the first load multiplier. Recall that on first load, it may be desirable to load several weeks' or months' worth of historical data in the first day, week, or hours. Depending on the Web Analytics platform, the historical data may show up as live or very recent data rather than historical. In the case that the data is going to show up as live or recent data—or "compressed" (for example to show several weeks over the course of one week), it may not be desirable to want to use the default traffic multiplier. The reason is that it would result in higher than normal aggregate traffic metrics. For example, assume that the default US multiplier is 100×. So, for every visitor, 100 simulated visitors would be pushed in. So, normally, if there are 100 US visitors, 10,000 simulated visitors would be pushed in.

If on first load, 10 weeks of visitors over the course of the first week are loading in, the result would be loading 10×100×100=100 k simulated visitors. To account for that, it would be desirable to adjust the default US multiplier based on the amount of historical traffic that is being pushed in and over what "compression factor." In this case, the "compression factor" is ten because ten weeks of data is compressed into one week. So, the multiplier needs to be divided by that; 100/10=10 would be the new US multiplier for first load. But, if instead, the 10 weeks is being pushed in over the course just 1 day, our "compression factor" would be 70. So, it would likely be necessary to divide the 100/70=1.42. Of note—a 1.42 multiple can be inconvenient when referring to users. It may be desirable to ensure that the compression factor doesn't allow significant remainders like that. In the case where 70 days of traffic is being pushed in over the course of 1 day, it may not be desirable to do that. It may be more desirable to ensure that the compression factor, in that case, is either 100 or 50. In this example, this would mean either pushing the data in over the course of 17 hours, or 34 hours. Allowing the "compression factor" to exceed the default multipliers (compression factor>100 in this case) may not be desirable.

Step 498 involves running the first load. After either calculating defaults, getting user input, or a combination of both, load "first run" data import over the time range, using the geographic or demographic multipliers.

What is claimed is:

1. A method of loading clickstream data into a web analytics platform comprising the steps of:
   A. retrieving a finite amount of clickstream data from a computer server by using an internet web browser application on a host computer;
   B. determining whether the clickstream data includes a first indicator that demonstrates that a user viewed a particular page of a website and, if the first indicator is present, then forming a first data structure representing the page view indicator in a data file;
   C. determining whether the clickstream data includes a search URL and query string of the referrer header associated with a previous on-tab search engine result page;
   D. determining whether the user viewed the particular page by clicking on a link on the previous search engine result page, and if the particular page was viewed by clicking on the link:
      i. changing the referrer header to include the search URL; and
      ii. inserting the referrer header into the data file; and
   E. sending the data file from the host computer to the web analytics platform.

2. The method of claim 1 wherein the step of determining whether the user viewed the particular page, further comprises the steps of:
   A. calculating a multiplier; and
   B. inserting the multiplier into the data file.

3. The method of claim 1 wherein the first data structure further comprises the following information:
   A. a page URL; and
   B. a user ID.

4. The method of claim 2 wherein the multiplier is calculated based on the user's geographic origin.

5. The method of claim 2 wherein the first data structure is replicated based on the multiplier.

6. The method of wherein the previous search engine result page is an on-tab search engine result page.

7. A method of loading clickstream data into a web analytics platform comprising the steps of:
   A. retrieving a finite amount of clickstream data from a computer server by using an internet web browser application on a host computer;
   B. determining whether the clickstream data includes a first indicator that the user completed an action event and, if the first indicator is present, then inserting a first data structure representing the action event into the data file;
   C. determining whether the clickstream data includes a search URL and query string of a referrer header associated with a previous search engine result page;
   D. determining whether the user viewed the particular page by clicking on a link on the previous search engine result page, and if the particular page was viewed by clicking on the link:
      i. changing the referrer header to include the full search URL; and
      ii. inserting the referrer header into the data file; and
   E. sending the data file from the host computer to the web analytics platform.

8. The method of claim 7 wherein the step of determining whether the clickstream data includes the first indicator further comprises the steps of:
   A. determining whether the web analytics platform supports the action event;
   B. determining whether the action event should be included in the data file, and if action event was to be included then inserting into the first data structure information from the following:
      i. User ID; and
      ii. event.

9. The method of claim 7 wherein the step of determining whether the user viewed the particular page, further comprises the steps of:
   A. calculating a multiplier; and
   B. inserting the multiplier into the data file.

10. The method of claim 7 wherein the first data structure further comprises the following information:
    A. a page URL; and
    B. a user ID.

11. The method of claim 9 wherein the multiplier is calculated based on the user's geographic origin.

12. The method of claim 9 wherein the first data structure is replicated based on the multiplier.

13. The method of claim 7 wherein the previous search engine result page is an on-tab search engine result page.

14. A method of loading clickstream data into a web analytics platform comprising the steps of:
    A. retrieving a finite amount of clickstream data from a computer server by using an internet web browser application on a host computer;
    B. determining whether the clickstream data includes a first indicator that the user completed an e-commerce event and, if the first indicator is present, then inserting a first data structure representing the e-commerce event into the data file;
    C. determining whether the clickstream data includes a search URL and query string of a referrer header associated with a previous search engine result page;
    D. determining whether the user viewed the particular page by clicking on a link on the previous search engine result page, and if the particular page was viewed by clicking on the link:
       i. changing the referrer header to include the full search URL; and
       ii. inserting the referrer header into the data file; and
    E. sending the data file from the host computer to the web analytics platform.

15. The method of claim 14 wherein the step of determining whether the clickstream data includes the first indicator further comprises the steps of inserting into the first data structure information reflecting a commercial transaction from the clickstream data.

16. The method of claim 14 wherein the step of determining whether the user viewed the particular page, further comprises the steps of:
    A. calculating a multiplier; and
    B. inserting the multiplier into the data file.

17. The method of claim 14 wherein the first data structure further comprises the following information:
    A. a page URL; and
    B. a user ID.

18. The method of claim 16 wherein the multiplier is calculated based on the user's geographic origin.

19. The method of claim 16 wherein the first data structure is replicated based on the multiplier.

20. The method of claim 14 wherein the previous search engine result page is an on-tab search engine result page.

* * * * *